United States Patent [19]
Cartmell et al.

[11] 3,720,623
[45] March 13, 1973

[54] ENCAPSULATED LIQUID CRYSTALS

[75] Inventors: James V. Cartmell; Donald Churchill, both of Dayton, Ohio

[73] Assignee: The National Cash Register Company, Dayton, Ohio

[22] Filed: Feb. 8, 1971

[21] Appl. No.: 113,716

[52] U.S. Cl............252/316, 23/230 LC, 117/37 R, 117/100 A, 117/159, 252/403, 252/408, 264/4, 350/160 P, 350/160 R
[51] Int. Cl. .................................Bo1j 13/02
[58] Field of Search ...............252/316; 117/100 A; 23/230 LC; 350/160 R, 160 P; 264/4

[56] References Cited

UNITED STATES PATENTS

| | | |
|---|---|---|
| 3,341,466 | 9/1967 | Brynko et al.........................252/316 |
| 3,499,112 | 3/1970 | Heilmeier et al. .............23/230 LC X |
| 3,578,844 | 5/1971 | Churchill et al..................252/316 X |
| 3,600,060 | 8/1971 | Churchill et al..................252/316 X |

*Primary Examiner*—Richard D. Lovering
*Attorney*—E. Frank McKinney and Patrick P. Pacella

[57] ABSTRACT

A mixture of cholesteric liquid crystal material such as cholesteryl nonanoate and nematic liquid crystal material such as methoxybenzilidene-p-n-butylaniline is disclosed. The mixture can be encapsulated and employed in temperature-sensitive visual display devices. The addition of nematic liquid crystal material to cholesteric liquid crystal material enhances the brightness of films employing cholesteric liquid crystal material and prolongs the usable life of the films.

6 Claims, No Drawings

ENCAPSULATED LIQUID CRYSTALS

This invention relates to unencapsulated and encapsulated mixtures of liquid crystals. This invention also relates to temperature-sensitive visual display devices.

Most organic crystalline solids exhibit a distinct transition temperature at which the solid melts to an isotropic liquid state. Many compounds, however, exhibit an intermediate phase such that on heating to a temperature (T), the solid melts to a highly colored liquid state which can be optically anisotropic. On further heating, the material undergoes one or more subsequent phase transitions finally becoming an optically anisotropic liquid. The intermediate phases commonly are called liquid crystals. A general discussion of liquid crystals is found in the publication, "Molecular Structure and the Properties of Liquid Crystals," by G. W. Gray, published in 1962 by Academic Press, New York and London.

The liquid crystal state of most interest to this invention is that most commonly exhibited by esters of cholesterol called the cholesteric state. The domains of aligned molecules in cholesteric liquid crystals are capable of affecting a probing incident light in such a manner that the probing light is reflected in a distinctive spectral hue, usually in bands, dependent on temperature. In most instances the effect is iridescent, depending on the quality of the incident light. This reflectance of light in relatively narrow bands is usually referred to as light scattering. This light scattering is a function of the physical ordering of the material in the liquid crystal state rather than electronic absorption of light as in the case of other dyes and absorbing molecules.

The particular color of the scattered light is a function of the temperature of the liquid crystals. This feature has led to the use of liquid crystals for thermal mapping. Thin films of liquid crystals can indicate the temperature of a substrate by the color of the film.

Up to this time, the utility of cholesteric liquid crystals in temperature-sensitive systems has been severely limited for a number of reasons. For example, in the light scattering state, cholesteric liquid crystals are a viscous, sticky liquid and require considerable care in handling. Other problems are set forth in U.S. Pat. application Ser. No. 798,237, filed Nov. 5, 1968, by Donald Churchill et al. One answer lies in the encapsulation of cholesteric liquid crystals as described in U.S. Pat. application Ser. No. 798,237.

Another problem which besets these systems is the loss of color brightness over a period of time. Cholesteric liquid crystals used for thermal mapping and other applications are generally a combination of several esters, ethers or carbonates of cholesterol. By adjustment of the components and proportions, it is possible to select the temperature at which color appears and the temperature range over which color is seen. One of the major components of commonly used mixtures is oleyl cholesteryl carbonate. This compound is relatively unstable and contributes to the visual deterioration of the system.

Encapsulated mixtures of at least one cholesteric liquid crystal and at least one nematic liquid crystal now have been found. The addition of nematic liquid crystals enhances the brightness of films and prolongs the usable lifetime. Also, by the addition of nematic liquid crystals, oleyl cholesteryl carbonate can be eliminated from the mixtures, if desired.

The term "nematic" means "thread-like," since materials in this state frequently assume a characteristic thread-like texture when a thin section of the material is viewed between crossed polaroids. When a nematic crystalline solid is heated in a capillary tube, the crystals collapse sharply at the melting point and form a flowing turbid liquid. At a higher temperature, the turbidity of the nematic liquid crystal disappears and the liquid becomes an ordinary isotropic liquid. An example of a nematic liquid crystal is methoxybenzilidene-p-n-butylaniline.

With respect to both cholesteric and nematic liquid crystals, the liquid crystal state often is called the mesomorphic state or mesophase.

Accordingly, an object of this invention is to provide unencapsulated and encapsulated mixtures of at least one cholesteric liquid crystal material and at least one nematic liquid crystal material.

Another object of this invention is to provide temperature-sensitive visual display devices.

Other objects, aspects and advantages of this invention will be apparent to one skilled in the art from the following disclosure and appended claims.

The cholesteric liquid crystals that can be employed in this invention vary widely. Examples of the cholesteric liquid crystals that can be employed in this invention are found on page 3 of the above-identified U.S. Pat. application Ser. No. 798,237, now abandoned.

Suitable chromatically responsive cholesteric liquid crystal materials include, but are not limited to, the following: cholesteryl halides, e.g., cholesteryl chloride, cholesteryl bromide and cholesteryl iodide; cholesteryl nitrate and other mixed esters of cholesterol and inorganic acids, cholesteryl esters of saturated and unsaturated, substituted and unsubstituted organic acids, esp. cholesteryl esters of $C_1$ to $C_{22}$ aliphatic, monocarboxylic acids, e.g., cholesteryl nonanoate, cholesteryl crotonate, cholesteryl chloroformate, cholesteryl chlorodecanoate, cholesteryl chloroeisosanoate, cholesteryl butyrate, cholesteryl caprate, cholesteryl oleate, cholesteryl linolate, cholesteryl linolenate, cholesteryl laurate, cholesteryl erucate, cholesteryl myristate, oleyl cholesteryl carbonate, cholesteryl heptyl carbamate, decyl cholesteryl carbonate; cholesteryl esters of unsubstituted or halogenated aryl, -alkenaryl, -aralkenyl, -alkaryl and -aralkyl organic acids, especially cholesteryl esters of those organic acids containing an aromatic moiety and from seven to 19 carbon atoms, such as, cholesteryl p-chlorobenzoate, cholesteryl cinnamate; cholesteryl ethers, e.g., cholesteryl decyl ether, cholesteryl lauryl ether, cholesteryl oleyl ether, etc.

Some exemplary mixtures of cholesteric liquid crystal materials which can be employed in accordance with this invention include, but are not limited to, the following: cholesteryl nonanoate, cholesteryl chloride and cholesteryl cinnamate; cholesteryl nonanoate and cholesteryl chloride; cholesteryl nonanoate and cholesteryl bromide; cholesteryl nonanoate, cholesteryl bromide and cholesteryl cinnamate; cholesteryl nonanoate, cholesteryl iodide and cholesteryl cinnamate; cholesteryl nonanoate, cholesteryl iodide and cholesteryl benzoate; cholesteryl nonanoate, cholesteryl chloride and oleyl cholesteryl carbonate; cholesteryl nonanoate, cholesteryl chloride and oleyl cholesteryl carbonate and cholesteryl bromide; oleyl cholesteryl carbonate and cholesteryl iodide, oleyl cholesteryl carbonate and cholesteryl p-chloro benzoate; etc.

Also, it should be understood that included within the term cholesteric liquid crystalline mixtures can be mixtures of two or more individual cholesteric materials.

The nematic liquid crystals that can be employed in this invention are alkoxybenzilidene-p-n-alkylaniline or hydroxyalkoxybenzilidene-p-n-alkylaniline wherein each alkoxy, hydroxyalkoxy or alkyl group has one to four carbon atoms.

Specific examples of these nematic liquid crystals are: methoxybenzilidene-p-n-butylaniline; ethoxybenzilidene-p-n-butylaniline; hydroxyethoxybenzilidene-p-n-butylaniline; methoxybenzilidene-p-n-ethylaniline; propoxybenzilidene-p-n-propylaniline; hydroxypropoxybenzilidene-p-n-ethylaniline; and the like. Methoxybenzilidene-p-n-butylaniline and ethoxybenzilidene-p-n-butylaniline are commercially available from Vari-Light Corporation, Cincinnati, Ohio.

Generally, the mixtures of this invention comprise 5 to 40 weight percent of the nematic liquid crystals and 60 to 95 weight percent of the cholesteric liquid crystals. Preferably, these mixtures comprise 10 to 30 weight percent of the nematic liquid crystals and 70 to 90 weight percent of the cholesteric liquid crystals.

The preferred method of preparing capsules eligible for containing mesomorphic materials has been disclosed in U.S. Pat. No. 2,800,457, issued July 23, 1957 on the application of Barrett K. Green and Lowell Schleicher. While the aforementioned capsule preparation system is preferred, it should be understood that the capsule product of this invention can be attained by any of the many later-developed encapsulation techniques which is capable of producing capsules of the required small dimensions. The final form of the capsular material to be coated is preferably 5-to-50-micron capsules, but it has been found that any size of capsules can be successfully utilized, the larger capsules only showing a decreased degree of visual resolution when used in a data display system. The minute individual capsules employed in this invention have light-transmitting capsule walls. While U.S. Pat. No. 2,800,457 discloses a pioneer invention concerning the encapsulation on a minute scale, reference is also made to U.S. Pat. No. 3,341,466, issued Sept. 12, 1967 on the application of Carl Brynko et al., which discloses the technique of making larger-than-microscopic capsules.

Films comprising encapsulated mesomorphic materials for use in this invention can be manufactured by several methods. When the capsules are prepared according to the techniques disclosed in the above-named patents or by other techniques wherein the capsule wall material is tacky after manufacture and before drying, the capsules can be cast while tacky onto a substrate material as a slurry, with either the capsule manufacturing vehicle or other, selected, liquid as the slurrying vehicle. The capsule walls, being tacky while drying on the substrate, stick to each other and to the substrate without the use of an added binder such as polymeric film-forming material.

If desired, an added binder matrix of polymeric material can be used in manufacture of the display film wherein capsules which contain the mesomorphic material are dispersed in a liquid solution of polymeric binder material and the resulting dispersion is cast onto a substrate material and dried to yield a coated construction of capsules embedded in a polymeric binder film. The substrate can be of any conventional sheet material, including glass, and a polymeric material of the same kind as that of the binder material or not, as desired or required by the intended purpose. Binder material useful in the practice of this invention must be translucent or substantially transparent in order for light, incident to the display films, to be transmitted therethrough to and from the mesomorphic material.

A dispersion of the encapsulated liquid crystal material in a liquid solution of film-forming binder material need not necessarily be cast permanently onto a substrate. Such a dispersion can be cast onto a support and dried, so that the resulting film of capsules embedded in binder material is strippable or otherwise separable from the support to yield a self-supporting display film having capsules more or less evenly distributed throughout.

Another feature of the incorporation of encapsulated materials into a system to provide a temperature-sensing device is the utilization of a mixture of capsules as to size and content for indicating a wide range of temperatures. Such a system, in one case, may consist of layers, each layer comprising one, two, or more types of capsules having different characteristics. These adjustments of characteristics may involve:

a. temperature response range;
b. size of liquid core;
c. type and thickness of capsule wall material;
d. kind of mesomorphic materials, and the like, all to the purpose of choosing an exact response suitable for the proposed use.

A further feature of this invention involves the use of a colored material as the wall of the mesomorph-containing capsules. Capsule walls serve, in this case, as liquid containers and also as color filters for light traveling to and from the mesomorphic materials. Capsule walls are easily tinted by the use of stains. Such a controlled system would find use in devices where the broad spectrum iridescent effect is objectionable.

The encapsulated mixtures of this invention can be a coating on a substrate sheet, wherein the liquid crystals generally are in the crystalline solid state or the isotropic liquid state. The capsules can be applied from a slurry wherein the slurry liquid is the liquid in which the capsules were manufactured or another dryable liquid. The capsules adhere to each other and the substrate by residual capsule wall material in the solution or by tacky capsule wall material itself.

The substrate can be any suitable material, thick or thin, transparent or opaque, colored or not. Capsules having an average diameter of 5 to 1,000 microns or slightly larger can be used for the coating. One capsule layer or a number of superimposed layers can be used, depending upon conditions and requirements of intended use. Different areas of the same surface can contain different kinds of capsules. If desired, the substrate sheet can have a coating wherein capsules are embedded in a polymeric binder material.

A display screen can comprise a coating of capsules containing only one thermotropic mixture, which has been coated onto a substrate of self-supporting material. An energy source such as an infrared light can be directed at the display sheet and controlled by a stencil. Infrared rays which pass the stencil are absorbed on the display sheet and raise the sheet surface temperature in such a manner as to cause a color change having an outline similar in shape to the stencil cut-out.

Further, the encapsulated mixtures can be coated on a display screen substrate which has the same color as the unheated encapsulated mixture of cholesteric and nematic liquid crystals. Infrared rays then can be directed in a beam through a focusing lens system. The capsules in the beam-image area are warmed, causing the iridescent appearance of an image. Any source of energy can be employed. Heat lamps are depicted only as a convenient means of a readily available energy source.

A direct reading temperature display device can employ more than one encapsulated mixture. The device has layers of encapsulated mixtures coated on its front surface, each layer being applied in the outline of the numerals which represent the temperature at which the layer undergoes a color change. When the surface absorbs infrared radiation of an amount required to bring the temperature of the capsules to the advent temperature of one layer, the result of the heat absorption is a visual indication of the surface temperature, e.g., a number such as 25 would appear on the screen.

If more radiation is supplied to raise the temperature above the coloration temperature of the first encapsulated mixture and up to the coloration temperature of a second different encapsulated mixture in another layer, the result is the disappearance of the first set of numerals and the subsequent appearance of a second set of numerals indicating another advent temperature.

Still further, capsules can be coated onto a display sheet for a data display. The display characters are caused to appear by contact with a warm character such as embossed type.

The proportion of nematic liquid crystal in the encapsulated mixture determines the color advent temperature, i.e., the temperature at which color first appears when the films are heated. Nematic liquid crystals greatly extend the lattitude of the color advent temperature making it possible to formulate encapsulated cholesteric liquid crystal films which show color below 0° Centigrade. Such low temperature systems are not possible with standard mixtures containing oleyl cholesteryl carbonate in combination with other cholesteric compounds.

An additional feature of this invention is the appearance of a thermal memory effect. If films of the encapsulated mixtures are heated to the isotropic state and cooled, a dark image of the heated area is evident. This image gradually disappears and the color returns over a period of several hours. This feature is useful if it is desired to know if a surface has been above a certain temperature within a period of several hours. Such a feature is described for unencapsulated mixtures containing high amounts of nematic liquid crystals employing the application of electric fields in Laser Focus Magazine, Volume 6, No. 9, pages 49–50 (September 1970).

The primary feature of this invention is the addition of certain nematic liquid crystals to cholesteric systems to yield a product of enhanced brightness of scattered light and to retain this color scattering under adverse storage conditions.

The advantages of this invention are further illustrated by the following examples. The reactants and the proportions and other specific conditions are presented as being typical and should not be construed to limit the invention unduly.

EXAMPLE I 1.25 grams of acid-extracted pigskin gelatin, having a Bloom strength of 285 to 305 grams and an isoelectric point of pH 8–9, and 1.25 grams of gum arabic were stirred with 125 grams of distilled water at 55 degrees centigrade in a Waring Blendor to yield a solution, which was at about pH 4.5. When the solution was formed, the pH was adjusted to 6.0 by the drop-by-drop addition of 20 percent, by weight, aqueous sodium hydroxide solution. To the above system was added a solution of 2 grams of cholesteryl chloride in 8 grams of cholesteryl nonanoate and 1 gram of methoxybenzilidene-p-n-butylaniline. The liquid crystal materials were emulsified in the Waring Blendor vessel to an average droplet size of 5 to 30 microns, and the pH of the system was slowly reduced by the dropwise addition of 14 percent, by weight, aqueous acetic acid solution. Addition of acid was continued until the polymeric material phased out of solution and began to deposit on the liquid crystal droplets. At this final state, the system pH was about 5.

The entire liquid system was then chilled with an ice bath to below 10° Centigrade, while the agitation was continued. At 10° Centigrade, 0.6 milliliter of a 25 percent, by weight, aqueous solution of pentanedial, a chemical hardening agent for the gelatin, was added to the Blendor vessel, and the system was allowed to stir for about 12 hours while slowly returning to room temperature. At the end of that time, the capsule walls were firm and hardened, and the capsular system was poured through a wire mesh sieve having openings of 74 microns. That which passed the screen was suitable for coating the intended substrate. Capsules, along with the equilibrium liquid which passed through the sieve, were coated, using a drawdown applicator, to a wet thickness of more than 2 but less than 10 mils onto a blackened, 5-mil-thick, polyethylene terephthalate film (sold as "Mylar" by E. I. du Pont de Nemours and Company, Incorporated, Wilmington, Del.) and then were dried in air at about 25° Centigrade. Note, all percents are by weight unless otherwise specified.

EXAMPLE II

Other encapsulated mixtures of methoxybenzilidene-p-n-butylaniline (hereinafter referred to as MBBA) and cholesteric esters were prepared according to the general procedure described in Example I. They are as follows:

1) 70% cholesteryl nonanoate  
   25% cholesteryl chloride         +10% MBBA  
   5% cholesteryl cinnamate 2) 95% cholesteryl nonanoate  
   5% cholesteryl chloride         +10% MBBA 3) 79.2% cholesteryl nonanoate
   20.8% MBBA
4) 81.8% cholesteryl nonanoate
   12.5% MBBA
   5.7% cholesteryl chloride
5) 72.0% cholesteryl nonanoate
   6.1% cholesteryl chloride
   18.4% oleyl cholesteryl carbonate
   3.5% MBBA As the following examples will demonstrate, the addition of nematic liquid crystals such as methoxybenzilidene-p-n-butylaniline to cholesteric liquid crystals lowers event temperatures, increases brightness of reflected colors, lengthens event temperature control and improves stability of the mixture of liquid crystals.

The addition of 1 to 25 weight percent MBBA to cholesteryl nonanoate controlled event temperatures from −5° to 60° Centigrade. The spectral range remained constant, i.e., approximately 4° centigrade for red-blue hues.

EXAMPLE III

Sample No. 3 of Example II, 79.2 percent cholesteryl nonanoate and 20.8 percent of MBBA, was subjected to continuous ultraviolet light. After 3 weeks, little or no change in event temperature was noted. The color spectra indicated increased brightness, as well as being considerably brighter than similar blends employing oleyl cholesteryl carbonate rather than the nematic liquid crystals.

EXAMPLE IV

Another sample of 80 percent cholesteryl nonanoate and 20 percent MBBA encapsulated according to the general procedure of Example I continued to show good stability under a variety of aging conditions. Under ultraviolet light after nearly two months, event temperatures rose only 2° to 5° centigrade. Samples stored in the dark for the same length of time, demonstrated event temperature rises of approximately 1° to 2° Centigrade.

For even longer periods of time, changes in event temperature leveled off and thermal drift occurred. After 100 days aging time, the total event temperature rise in the samples was in the 4 to 5 degree centigrade range. However, the colors remained very bright.

EXAMPLE V

The following mixtures were encapsulated according to the general procedure described in Example I:
(1) 79 weight percent cholesteryl nonanoate (CN)
    21 weight percent propoxybenzilidene ethylaniline (PBEA) plus
    0.1 weight percent BHA (a)
    0.1 weight percent BHT (b) and
    a small amount of Na₂HSO₄ buffer
(a) butylated hydroxyanisole (antioxidant)
(b) 2,6-di-tert-butyl-p-cresol (antioxidant)
(2) 80.4 weight percent CN
    9.3 weight percent PBEA
    10.3 weight percent cholesteryl chloride plus
    0.1 weight percent BHA (a)
    0.1 weight percent BHT (b), and
    a small amount of buffer.

Color temperature data for the two samples were obtained and then the samples were stored in the dark.

At the end of 1 month of storage in the dark at room temperature, the average event temperature rise was 2.5° to 3° Centigrade.

EXAMPLE VI

The following two samples were prepared according to the general procedure described in Example I.

| Sample 1 | | Sample 2 | |
|---|---|---|---|
| cholesteryl nonanoate | 80% | cholesteryl nonanoate | 64% |
| methoxybenzilidene-p-n-butylaniline (MBBA) | 15% | oleyl cholesteryl carbonate | 30% |
| cholesteryl chloride | 5% | cholesteryl chloride | 6% |

Both samples contained very small amounts of antioxidants.

The reflectance of both samples was tested on a B&L 505 Spectrophotometer and the percent reflectance was recorded at 500 millimicrons. The samples were coated onto essentially opaque, black substrates such as the "Mylar" described in Example I. The percent reflectance for the samples was as follows:
Sample 1    28.0%
Sample 2    7.5%.

The above data illustrates the improved brightness (reflectance) that accompanies the addition of nematic liquid crystal material to cholesteric liquid crystal material.

Although this invention has been described in considerable detail, it must be understood that such detail is for the purpose of illustration only and that many variations and modifications can be made by one skilled in the art without departing from the scope and spirit thereof.

What is claimed is:

1. A mass of minute individual capsules having light-transmitting capsule walls and having core material consisting essentially of 60 to 90 weight percent of at least one cholesteric liquid crystal material and 5 to 40 weight percent of at least one nematic liquid crystal material of alkoxybenzilidene-p-n-alkylanilines or hydroxyalkoxybenzilidene-p-n-alkylanilines wherein each alkoxy, hydroxyalkoxy or alkyl group has one to four carbon atoms, wherein the capsules range in average diameter from 5 to 1,000 microns.

2. Capsules according to claim 1 wherein the core material consists essentially of 70 to 90 weight percent of the cholesteric material and 10 to 30 weight percent of the nematic material.

3. Capsules according to claim 1 wherein the cholesteric material is cholesteryl nonanoate, cholesteryl chloride, oleyl cholesteryl carbonate or cholesteryl cinnamate and the nematic material is methoxybenzilidene-p-n-butylaniline, ethoxybenzilidene-p-n-butylaniline, propoxybenzilidene-p-n-ethylaniline, hydroxyethoxybenzilidene-p-n-propylaniline or propoxybenzilidene-p-n-propylaniline.

4. Capsules according to claim 1 wherein the weight percent of cholesteric material is 80, the weight percent of nematic material is 20, the cholesteric material is cholesteryl nonanoate and the nematic material is methoxybenzilidene-p-n-butylaniline.

5. Capsules according to claim 1 wherein the cholesteric material is cholesteryl nonanoate and cholesteryl chloride and the nematic material is methoxybenzilidene-p-n-butylaniline.

6. Capsules according to claim 1 wherein the cholesteric material is cholesteryl nonanoate, cholesteryl chloride and oleyl cholesteryl carbonate and the nematic material is methoxybenzilidene-p-n-butylaniline.

* * * * *